United States Patent
Faruqi et al.

[11] Patent Number: 6,154,432
[45] Date of Patent: Nov. 28, 2000

[54] OPTICAL STORAGE SYSTEM

[75] Inventors: Farhan Ahmed Faruqi, Indooroopilly; Donna Kourtessis Martin, Armidale, both of Australia

[73] Assignee: Yenploy Pty Ltd., Brisbane, Australia

[21] Appl. No.: 08/981,951

[22] PCT Filed: Jul. 5, 1996

[86] PCT No.: PCT/AU96/00423

§ 371 Date: Apr. 27, 1998

§ 102(e) Date: Apr. 27, 1998

[87] PCT Pub. No.: WO97/02563

PCT Pub. Date: Jan. 23, 1997

[30] Foreign Application Priority Data

Jul. 5, 1995 [AU] Australia .................. PN 4010
Jan. 19, 1996 [AU] Australia .................. PN 7629

[51] Int. Cl.⁷ ............................................ G11B 7/00
[52] U.S. Cl. ................................. 369/103; 369/112
[58] Field of Search .......................... 369/103, 112, 369/44.12, 44.23, 44.37, 116, 121, 43–47; 359/22, 11, 10, 15, 19

[56] References Cited

U.S. PATENT DOCUMENTS

| | | |
|---|---|---|
| 4,737,745 | 4/1988 | Eich et al. . |
| 4,837,745 | 6/1989 | Eich et al. . |
| 5,148,421 | 9/1992 | Satoh et al. ............... 369/44.23 |
| 5,311,474 | 5/1994 | Urban ........................ 365/215 |
| 5,319,629 | 6/1994 | Henshaw et al. ............ 369/103 |
| 5,450,378 | 9/1995 | Hekker ....................... 369/103 |
| 5,489,451 | 2/1996 | Omeis et al. ................ 428/1 |
| 5,978,112 | 11/1999 | Psaltis et al. .............. 360/103 X |

FOREIGN PATENT DOCUMENTS

| | | |
|---|---|---|
| 256 554 | 2/1988 | European Pat. Off. . |
| 2 703 815 | 4/1993 | France . |
| 2 703 815 | 10/1994 | France . |
| 37 17 605 A1 | 11/1987 | Germany . |
| 37 17 605 C2 | 11/1991 | Germany . |
| 42 08 328 A1 | 9/1993 | Germany . |
| WO 90/09661 | 8/1990 | WIPO . |
| WO 90/03427 | 2/1993 | WIPO . |

OTHER PUBLICATIONS

"Spiropyran–doped poly(vinyl carbazole): a new photopolymer recording medium for erasable holography," Fatema Ghailane, et al., Feb. 1995, pps. 480–485, *Optical Engineering*.

Primary Examiner—Muhammad Edun
Attorney, Agent, or Firm—Merchant & Gould P.C.

[57] ABSTRACT

An optical storage system including an optical storage means (25) for holographic storage of data and an optical head (24). One embodiment of the optical storage means is a card the size and shape of a normal credit card. The optical head and associated control means may be embodied in a optical drive the size of standard disk drives. The system is able to write, read and erase data. The storage means (25) can store terabytes of information. The optical head (24) is an integrated optical element without moving parts.

25 Claims, 10 Drawing Sheets

OPTICAL STORAGE SYSTEM

FIELD OF THE INVENTION

This invention relates to an optical storage system incorporating a compact optical storage means and an optical head. In particular it relates to a holographic optical storage card able to store large amounts of data in a relatively small area and a read/write/erase head for use with the storage card.

BACKGROUND TO THE INVENTION

Current electronic parallel computers are capable of processing data at rates well into the GFLOP range. These peak rates can be achieved only when the data involved reside in the main memory of the system and can be transferred to the processing units at high speeds.

This is typically the case with numerically intensive problems such as scientific simulations and floating point calculations. A different class of problems, known collectively as non-numerical processing, includes data and knowledge base management, logic inferencing, image processing, machine vision, computer-generated holographic storage, and document retrieval. These applications are input/output intensive and rely on the computer's ability to process a vast amount of data which cannot fit in main memory but must be retrieved from secondary storage.

Therefore, the performance of the secondary memory system becomes critical and is usually determined by two factors: storage capacity (in Mbytes) and data transfer rates (in Mbytes per second). Both of these quantities must be as high as possible. In order for storage devices to keep up with the constant increase in database volumes, they must allow access to Terabytes of data in a relatively short time.

With existing technology the most inexpensive means of storing information is magnetic storage. Magnetic storage allows the storage of large amounts of data but has a number of limitations. Magnetic or electric fields can erase or corrupt the data, the storage medium can be tampered with, and the read/write process limits the data transfer rate achievable.

Optical storage media based on holographic data storage have greatly increased the amount of data which can be stored as well as improving security and data access time. The most common application of this technology is in audio or video compact disks.

The audio CD was introduced jointly by Philips and Sony in 1982. It stores digital bits as pits (or the absence of pits) impressed in its reflective surface along concentric tracks. Transparent plastic protects the surface, which is scanned by the beam of a solid-state laser having a 780-nm wavelength. The audio CD stores 640–680 MB of information, or about 74 minutes of music, assuming standard sampling rate, frequency, and encoding.

Two computing proposals for high-density disks have been announced: the Sony/Philips MultiMedia CD (MMCD) and the Toshiba/Time Warner Super-Density (SD) disk. As currently proposed, the latter is a two-layer disk that can hold 3.7 GB on a single layer, for a total capacity of 7.4 GB. The proposed SD disk stores 5 GB on each side, for a total of 10 GB.

Storage capacities on compact disc systems are large and thus very useful but limited by the mechanical parts and, to some extent, by the cost. Furthermore, the majority of known holographic data storage systems are read only. Such systems include CD ROM and WORM (write once read many).

Among various other storage systems, three-dimensional (3-D) optical memories, such as volume holograms and two-photon memories, appear very attractive. Holographic storage offers large digital storage capacity, fast data transfer rates, and short access times. Current storage technologies are limited in that they do not simultaneously provide each of these three features.

Erasable devices based on thermoplastic have been developed quite recently. One such device is that described in EP 256554 in the name of Teijin KK This patent describes a thermoplastic substrate for use in optical memory cards. The patent details a laminated card structure having defined lamination thicknesses to improve image contrast.

A random access optical memory device has been described by Uban and Urban in U.S. Pat. No. 5,311,474. The optical storage medium is divided into a matrix of storage fields which are accessed in parallel by using a beam multiplexer to simultaneous address each storage field.

Other known digital holographic storage techniques include storage of microfiche onto Mylar substrates using a holographic image storing technique whereby the microfiche is stored onto a master plate and the master is converted to an embossing master for stamping out onto Mylar or polyester substrates. Once the image or code is placed onto the master plate it is not changed in any way.

The inventor is not aware of any compact, high data volume, holographic storage device that is 'write many read many' (eg. erasable and rewritable).

Presently, processor speed far exceeds the ability of conventional rotating disk devices to import or to export the data needed for manipulations. As a result most computers are I/O bound. This I/O gap is widening at a steady rate as digital processor technology continually advances. Holographic data storage devices have the potential to overcome this gap by offering much faster data access time and higher data band-width than for conventional rotating disk devices having similar capacity in the gigabyte range. In addition to computer applications holographic data storage systems may be useful for optical interconnects, multimedia telecommunications and associative readout in optical processors to mention just a few examples. In particular, optical telecommunication networks offer data transfer rates in the gigabit per second range commensurate with potential holographic data storage system capabilities.

The usual holographic recording process involves the interference of two coherent, parallel polarisation light beams on an appropriate photosensitive material (photopolymerisable/photocrosslinkable). It is accomplished by combining an image-bearing light beam and a reference beam in a recording medium. The variation in intensity in the resulting interference pattern causes the complex index of refraction to be modulated throughout the volume of the medium.

In a bulk photorefractive medium, such as $LiNbO_3$, charges are excited from impurity centres in the presence of light and subsequently trapped. The resulting space-charge causes modulation in the index of refraction through the electro-optic effect. When the medium is exposed to a reference beam identical to one used in recording, the light will diffract in such a way as to reproduce the original image-bearing wavefront.

In holographic data storage, data are converted to an optical signal by use of an SLM (spatial light modulator). A hologram corresponding to the image (one data "page") on the SLM is then recorded in a photorefractive crystal or other suitable volume holographic recording medium.

There are two established methods of multiplexing the holograms within the recording medium. The first is spatial multiplexing, in which the data are stored in spatially adjacent but separate areas of the medium. This is often done by forming two-dimensional Fourier-transform hologram arrays and is most useful for thin surface-storage media. The second is angular multiplexing, in which holograms are completely superimposed within a common volume. This technique is most useful for thick volume-storage media such as photorefractive crystals because of their highly angularly selective behaviour arising from their thickness.

Optical heads have been described in the prior art for use with known optical data storage systems. The most common is the optical reader user in compact disc readers. These heads comprise a laser diode that illuminates the disc and a detector that records laser light reflected from the disk A signal processing algorithm derives digital information from the reflected signals which is transformed to the desired data.

Other optical heads incorporating specific features are also known. Reference may be had to U.S. Pat. No. 5,148, 421 assigned to Matsushita Electric Industrial Co Ltd which describes an optical head for rewritable discs. The head is designed for use with either single-sided or double-sided discs and incorporates correcting optics to account for aberrations. An actuator means positions the correcting optics. The mechanical components and complexity of the optical train limits the application of the device.

Reference may also be had to German Patent number DE3717605 assigned to Olympus Optical Co Ltd. This patent describes an optical read-write head for cards that uses a laser for writing and an LED for reading. A multi-segment detector is used to provide accurate focal length control and thereby increase recording density. The head is not able to perform a complete read/write/erase cycle.

It is clear from the above discussion that a number of issues need to be addressed in the design of a holographic data storage system. Crosstalk between superimposed images reduces the useful data capacity and is a major contributor to the overall system noise. As a result there is a tradeoff between data capacity and the achievable signal-to-noise ratio or bit error rate. It is preferable that the resolution of the storage process be limited by the optics or by the wavelength of light used rather than by the recording medium chosen.

A viable holographic storage system depends on suitable key component technologies, particularly the optical head and the optical storage medium.

OBJECT OF THE INVENTION

It is an object of the present invention to provide an optical storage means which is able to be written, read and erased multiple times.

It is a further object of the invention to provide an optical head that effects write, read and erase functions in an optical storage medium.

It is a yet further object of the invention to provide an optical storage system that incorporates the optical storage means and optical head.

Further objects will be evident from the following discussion.

DISCLOSURE OF THE INVENTION

In one form, although it need not be the only or indeed the broadest form, the invention resides in an optical storage system comprising:

an optical storage means for holographic storage of data, said optical storage means comprising a storage medium being writable, readable and erasable;
a source of coherent radiation for writing said data in said optical storage means;
a source of coherent radiation for reading said data from said optical storage means;
means for erasing said data from said optical storage means;
an optical head for directing said coherent radiation for writing, said coherent radiation for reading and said means for erasing to said optical storage means;
a control means for controlling the optical head to write, read and erase said data; and
signal processing means for encoding the coherent radiation for writing and decoding the coherent radiation for reading.

The source of coherent radiation for writing is preferably a laser operating at a blue wavelength.

The source of coherent radiation for reading is suitably a laser operating at a red wavelength.

The means for erasing may be a thermal source or an electric field but more preferably is a laser operating at a wavelength in an absorption band of the storage medium.

In preference said optical head includes modulating means and detecting means in signal connection with said signal processing means such that the modulating means encodes the coherent radiation for writing with modulations generated by the signal processing means and the signal processing means decodes modulations detected by the detecting means.

The system may further comprise a servo-mechanical means for performing relative positioning of the optical head with respect to the optical storage means.

In a further form, the invention resides in an optical storage means for an optical storage system comprising:
a substrate coated with a reflective material;
a tracking layer deposited on the substrate, said tracking layer including a plurality of tracks, each track having a tracking portion and a data writing portion; and
an erasable storage medium deposited on the tracking layer;
wherein data is stored in the erasable storage medium as diffraction patterns.

The substrate may suitably be glass, or plastic but preferably Mylar. The substrate may be coated with any reflective material although a metal such as aluminium is preferable.

The tracking layer is preferably an embossed surface relief layer. The layer is suitably about 30 $\mu$m thick.

The tracking portion of each track is suitably a linear strip and the data writing portion is suitably an array of dots. Each dot preferably has a diameter of about 0.5 $\mu$m.

The tracking portion and the data writing portion of the tracks are arranged to be closely adjacent so as to provide maximum storage density.

Tracks are preferably divided into sectors and sectors are preferably divided into a number of fields. The fields are suitably selected from one or more of the following fields; a sector identification field, data identification field, error check and correction field, and data storage field.

In preference the erasable storage medium may be a thin medium that allows the recording of a single hologram onto a surface or a thick medium allowing recording of multiple holograms at multiple angles into the medium. The preferred medium allows erasure of the hologram but has long life storage capability and fast recording response time.

Suitable materials include inorganic photochromic crystals, photorefractive materials, chalcogenide semiconductors, organic and polymer materials, thermoplastic media, reversible recording in Tellerium compounds, photothermal recording in Antimony compounds, magneto-optic recording and light stimulated recombination luminescence.

In preference the erasable storage medium is a thermoplastic material erasable by applying a thermal field or a field-erasable photorefractive polymer material that is erasable by applying a strong electric field adapted to realign the chains of the polymer of the storage medium.

The size and type of tracks and the tracking process preferable comply with ANSI and ISO continuous composite format standards.

In a further form the invention resides in a method of holographic data storage including the steps of:

producing a master plate containing a negative of a plurality of tracks;

producing a blank optical storage means being a substrate coated with a reflective coating;

embossing the blank optical storage means from the master plate to form a plurality of tracks;

coating the embossed optical storage means with an erasable storage medium;

holographically writing data onto the tracks of the optical storage means, said data being in the form of diffraction patterns generated by a phase difference between a reference coherent beam and a writing coherent beam;

wherein the data is read holographically by measuring signals from the optical storage means when illuminated by a reading coherent beam.

In preference the step of holographically reading the data recorded in the optical storage means includes the steps of illuminating the optical storage means with a reading beam of the same wavelength as the reference beam and at the same angle as used to record the data. In an alternative method the data is read holographically using a reading beam having a different wavelength to the reference beam and at a different angle to that used to record the data.

The data may suitably be recorded in a plurality of zones, each zone corresponding to a different depth in the tracks of the optical storage means.

The data is suitably protected against unauthorised reading by writing to sectors in a coded order. A first recorded sector preferably includes a code which is readable to decode the order of writing. The level of security may suitably vary from sector to sector according to the sensitivity of data recorded therein.

In a yet further form the invention resides in an optical head for an optical storage system comprising:

multiplexer means for selecting one or more sources of coherent radiation;

demultiplexer means for dividing the selected radiation into multiple beams;

means for coding a modulation to one or more of the multiple beams;

and means for deflecting the modulated multiple beams to a desired location in an optical storage means.

The means for coding a modulation preferably comprises means for coding an amplitude modulation and/or means for coding a phase modulation and/or means for coding a polarization modulation to one or more of the multiple beams.

In preference the means for deflecting the modulated multiple beams further comprises a plurality of deflector cells and means for switching one or more of the modulated multiple beams to a desired deflection cell.

The optical head may further comprise means for receiving reflected radiation and directing the reflected radiation to a detector means. The detector means detects the phase, amplitude and polarization coding.

In preference the optical head is adapted for use with three sources of coherent radiation corresponding to wavelengths for reading, writing and erasing an optical storage means.

The means for coding amplitude modulation and the means for coding phase modulation are preferably a Mach-Zehnder type interferometer.

The means for coding a polarization modulation is preferably an electrooptic or acoustooptic polarization control device.

BRIEF DETAILS OF THE DRAWINGS

To assist in understanding the invention, preferred embodiments will now be described with reference to the following figures in which.

DETAILED DESCRIPTION OF THE DRAWINGS

Figure 1:
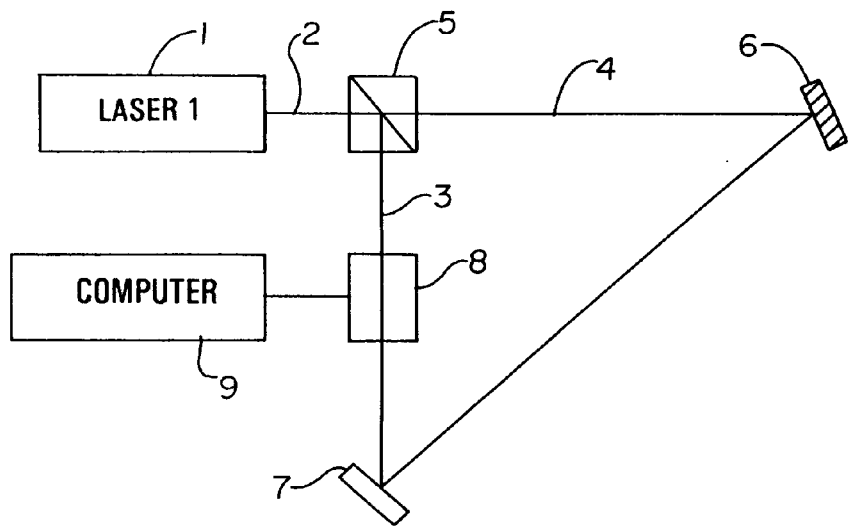
FIG. 1 is a schematic of holographic writing assembly.

In the drawings, like reference numerals refer to like parts.

Referring to FIG. 1, there is shown a conventional arrangement for holographic recording in an optical storage medium. A laser 1 provides a beam 2 of collimated coherent radiation. The beam 2 is split into a writing beam 3 and a reference beam 4 by beamsplitter 5. The reference and writing beams interfere at the optical storage medium 6. A mirror 7 is normally required to redirect one of the beams to the optical storage medium.

A modulation can be placed on the writing beam 3 by modulator 8. The modulator 8 may be electrooptic or acoustooptic and may modulate one or more of the phase, amplitude and polarization of the beam 3. A computer 9 is typically used to control the operation of the modulator in a known way so as to encode the beam 3 with desired information which is subsequently stored in the optical storage medium 6.

Figure 2:
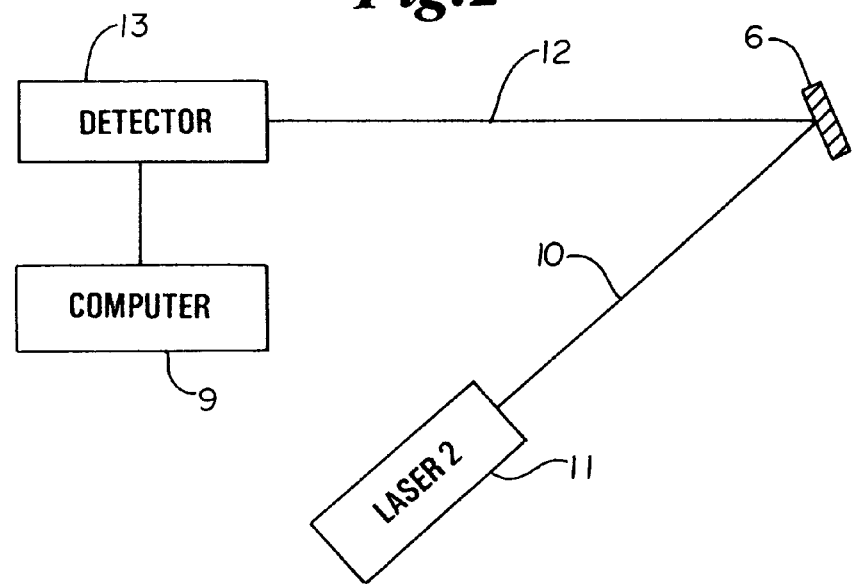
FIG. 2 is a schematic of a holographic reading assembly.

The stored information is retrieved from the optical storage medium 6 by the arrangement shown in FIG. 2. The optical storage medium 6 is illuminated with a beam 10 from a laser 11. Typically, the laser 11 has a different wavelength to the writing laser 1. Since the reading and writing is occurring at different wavelengths the incident angle of the respective beams with the optical storage medium will be different and set by the Bragg relation. A reflected beam 12 impinges a detector 13 which supplies signals to, typically, a computer 9 for analysis to decode the encoded information.

Figure 3:
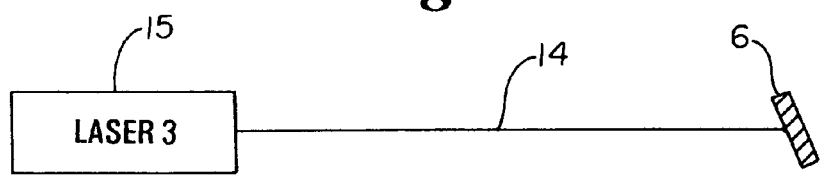
FIG. 3 is a schematic of a holographic erasing assembly.

The information stored in the optical storage medium 6 can be erased by irradiation with a beam 14 from a laser 15 operating at a different wavelength, as depicted in FIG. 3.

Figure 4:
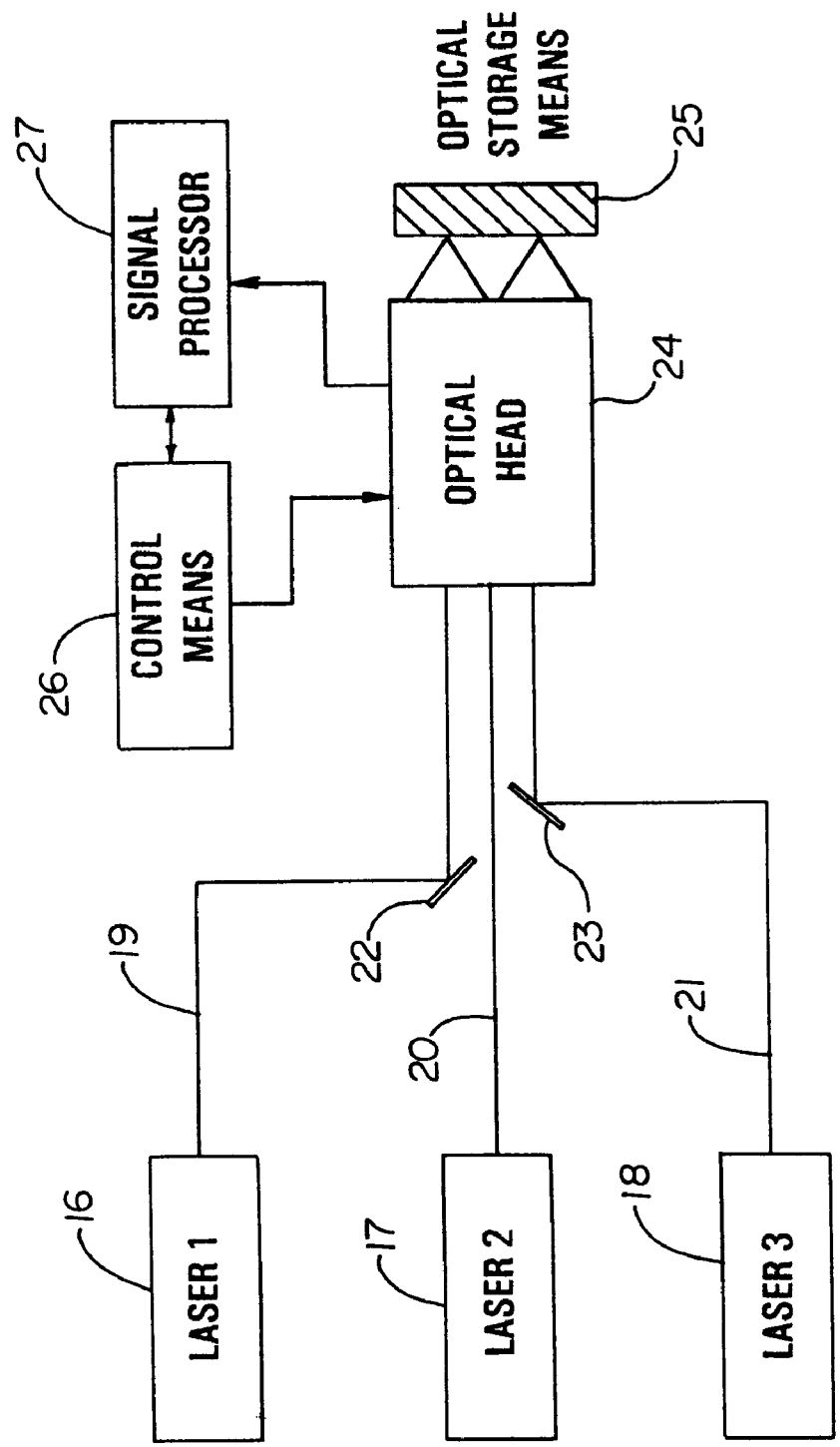
FIG. 4 is an optical schematic of an optical storage system.

The optical storage system is depicted in FIG. 4. The laser beams for the write/read/erase cycles are provided by a frequency doubled diode laser 16 operating at 488 nm, a diode laser 17 operating at 780 nm and a helium neon laser 18 operating at 633 nm. The laser beams 19, 20 and 21 respectively are directed to the optical head 24 by mirrors 22 and 23. The optical head 24 performs all necessary beam processing to effect holographic data recording in the optical storage means 25. The operation of the optical head 24 is controlled by control means 26. A signal processor means 27 performs encoding of data to be written to the optical storage means 25 and decoding of signals received from the optical storage means by the optical head. The signal processor means 27 and control means 26 may conveniently be embodied in a personal computer.

The above laser sources are described for example only and are not limiting. An alternative source of coherent radiation in the blue region is a $Pr^{3+}$ laser that emits at 490 nm. The $Pr^{3+}$ laser can be very compact when provided as a $Pr^{3+}$-doped fluoride fibre up-conversion laser. The up-conversion laser is pumped by two laser diodes operating at 1017 nm and 835 nm, both of which are available laser diodes. The $Pr^{3+}$ also has a relatively strong emission at 635 nm which can be selected by appropriate control of the laser operation. The $Pr^{3+}$ laser can therefore provide the wavelengths for both writing and erasing. The 635 nm beam could also be used for reading most materials although it is generally desirable to read at a different wavelength from the writing wavelength. A 780 nm diode laser can be used for this purpose.

The control means 26 controls the wavelength selection in the optical head 24 (described below) and operation of the lasers as required. To obtain necessary power densities the $Pr^{3+}$ laser is operated Q-switched and the control of this function is by the control means 26.

By way of example the approximate power densities required and achievable are 5–10 mW/cm$^2$ at 490 nm for writing, 5 mW/cm$^2$ at 780 nm for reading and 10 mW/cm2 at 635 nm for erasing.

It will be appreciated that erasure may be effected thermally or by an electric field. In these cases the application of the thermal or electric energy is controlled by the control means. The choice of optical, thermal or electric erasure is dependent on the storage medium of the optical storage means.

Data is stored in the optical storage means in a series of diffraction (Airy) patterns. Conventional optical storage uses only binary signals. The inventors have found that higher order modes can be stored in the same data storage area as currently used. This is typically a spot 0.5 μm in diameter. The spots are arranged in tracks and these are typically arranged on 1 μm centres. The inventors have also found that a diffraction pattern can be recorded in the 0.5 μm spot providing the wavelength of the light is sufficiently short for two waves separated in phase to interfere. As mentioned above, the inventors use a writing wavelength of 490 nm. The optical storage means is illuminated by a reference beam and a writing beam separated in phase. The two beams interfere to produce interference fringes.

The fringes contain both phase and amplitude information which is extracted by the reading beam. In one arrangement the reflected reading beam is detected and the intensity is measured. The intensity of the reflected beam varies essentially as the cosine of the phase difference between the reference beam and the writing beam.

Thus, for a given frequency and amplitude it will be realised that the intensity (the square of the amplitude) is essentially proportional to the phase difference between the beams. The signal from a simple detector such as a silicon photodiode can be used to differentiate between recorded interference patterns. This gives a digital range only limited by the grain resolution of the recording medium and the signal resolution of the detector. The inventors hypothesise that ten or more digits may be possible. Four digits is equivalent to two bits using binary recording, so the data storage capacity is doubled in the absence of other considerations.

In this case, one diffraction spot will be equivalent to 1 byte of information. Each airy pattern will be picked up by a photodetector, and the intensity converted to the phase, and amplitude information recorded in each spot. The phase information would correspond to a particular 4 bit state, and the amplitude would correspond to a particular 4 bit state. The two states combined together would yield an 8 bit binary code which corresponds to one byte of information per dot. Thus, both the amplitude and phase information each can be broken down into 16 different intensity levels, with each level corresponding to a particular 4 bit binary code, when combined together produce one byte of information per dot.

Due to the requirement for maximizing surface area by decreasing spot diameter, it has been found that a Fraunhofer Diffraction pattern will contain the diffraction pattern within the designated spot area through the writing of Airy patterns. The light beam originates from a circular aperture, namely an optical fibre, rather than a slit. The basic principle is that of a Fraunhofer diffraction pattern, which represents the Fourier analysis of the diffracting aperture, in this case a grating or hologram. The diffraction pattern consists of an undeviated beam (the "dc" component) plus one order of diffraction on each side. The pattern is a superposition of two sine gratings. The optical storage means thus performs a Fourier synthesis when exposed, and adds together the individual sine waves caused by the interference between the reference and the writing beam. The result is a complex periodic wave pattern. The individual gratings can be encoded by modulating the phase, amplitude, and polarization of the writing beam, with respect to the reference beam. On reillumination at the reference beam angle, the encoded reading beam is returned and directed to a photodetector which detects the intensity change and decodes the object beam.

The optical head may be an integrated optical device or a hybrid optomechanical device. In the integrated optical head the steering of the write, read and erase beams is achieved by acoustooptic or electrooptic beam deflectors. The structure of the integrated optical head is described in more detail below. In the optomechanical case, the head is physically moved for the write, read and erase beams to access different storage addresses on the optical storage means. The optomechanical head is also described in more detail below.

Figure 5:
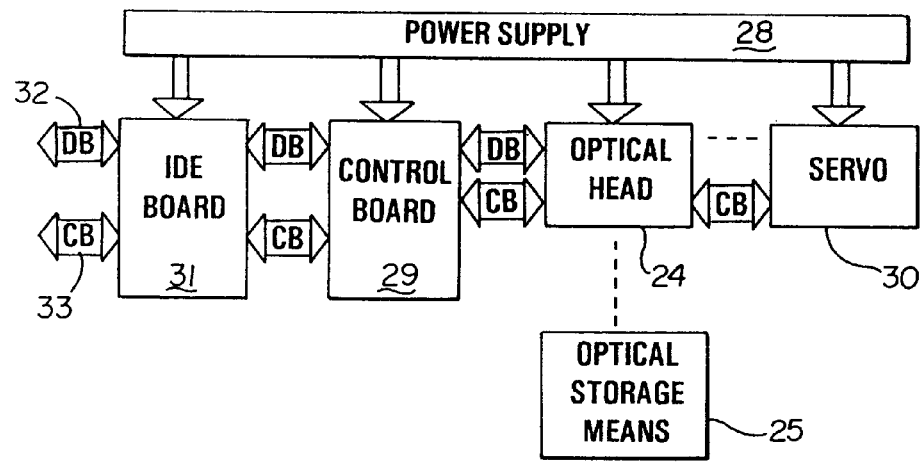
FIG. 5 is a block diagram of an optical storage system.

A block diagram of the control means is provided in FIG. 5. The control means comprises a power supply 28, which powers an optical head control board 29 for controlling the operation of the optical head 24. In the optomechanical case the optical head control board 29 will also control the servo mechanism 30 that moves the optical head 24 relative to the optical storage means 25.

Data is received via an IDE board 31 that is also powered by the power supply 28. Data is moved from an external source through the IDE board 31 to the optical head control board 29 and hence the optical head 24 on databus 32. A control bus 33 is provided for control signals.

Figure 6:
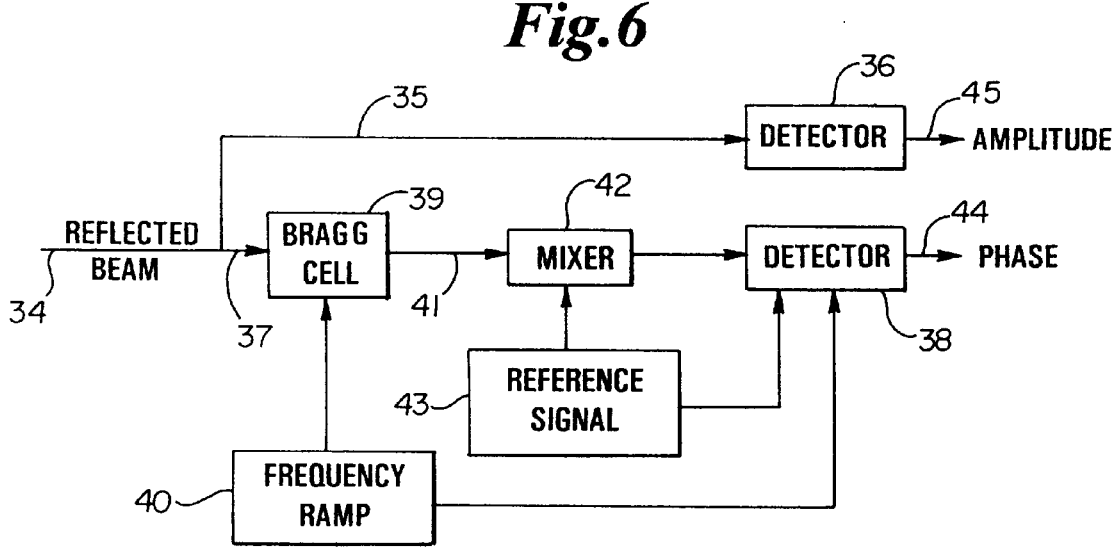
FIG. 6 shows a schematic of a data reading arrangement.

The signal processor 27 analysis the signals read from the optical storage means 25. One scheme for effecting the signal processing (a simple detector) has been described above. A more efficient system is shown in FIG. 6.

The process is essentially a heterodyne detection process. The reflected beam 34 is split with a portion 35 going to an amplitude detector 36 and a portion 37 going to a phase detector 38. The portion 37 is combined in a Bragg cell 39 with a frequency ramp 40. The combined optical signal 41 is mixed in a mixer 42 with a reference signal 43 and then goes to the detector 38 which also receives the frequency ramp 40. Heterodyne detection results in a phase signal 44 when the modulation frequency of the reflected beam equals that of the frequency of the ramp thus indicating that modulation frequency which is proportional to the phase difference.

The detector 36 provides an amplitude signal 45 which directly indicates the amplitude of the reflected beam.

An alternative signal processing technique is to use Fourier transforms. Fourier transform signal processing provides the phase directly rather than indirectly as in the method described above. Direct measurement of the phase difference between the reference and object beams provides double the data storage since the phase can vary between $-\Pi/2$ to $\Pi/2$ corresponding to a data range of $-1$ to $1$, whereas the above signal processing based on measuring amplitude can only have a data range of 0 to 1. Depending on available resolution the data range is quantised to provide multiple digits. Although providing phase directly there is a processing overhead which can unacceptably extend the data access time.

Amplitude Shift Keying, Phase Shift Keying, and Polarization Shift Keying can be employed for modulation and demodulation of the encoded beams. The signal processor means decodes the phase, amplitude, and polarization states through coherent heterodyne detection.

Optical detection as shown in FIG. 6 allows storage of phase and amplitude information which can be correlated with pre-stored date (eg. a holographic photo) hence allowing positive identification of a person by comparison of three dimensional data.

Figure 7:
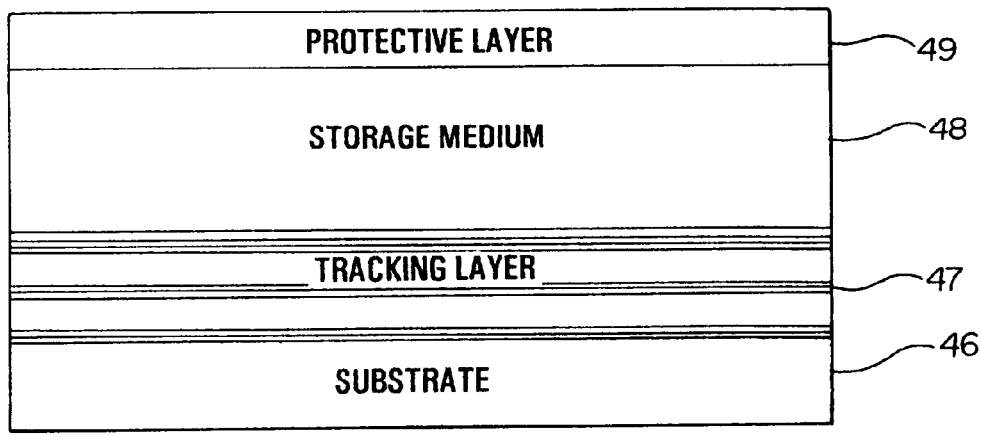
FIG. 7 is a schematic of an optical storage means.

The structure of the optical storage means is depicted in FIG. 7.

The storage means comprises a base material 46 which is suitably a metallised Mylar sheet. The base material 46 is embossed with a tracking layer 47. The tracking layer 47 may suitably be a holographic layer incorporating the tracks. This layer is suitably 30 $\mu$m thick. This tracking layer 47 serves to assist in the tracking process and provides tracking information. An erasable storage medium 48 is coated over the tracking layer 47. The storage medium is typically 50 $\mu$m thick and able to store multiple diffraction patterns at varying depths. A clear protective outer layer 49 is then coated over the storage means to give durability.

The tracking layer 47 provides all track, sector and alignment information required for tracking in the x-y plane. The tracks act as a virtual linear incremental optical encoder. Initially the optical head must be zeroed using zero reference marks for both the x & y coordinates. The control means may then keep track of which track or sector it is in via simple addition and subtraction of track and sector lines passed.

The under face of the base material may have printed or embossed information as commonly found on existing credit cards. For certain forms of optical storage medium it is also necessary to add additional layers to facilitate erasure of data. For example, an oxide layer is required for thermally erasable optical storage media.

The optical storage means is commonly produced as a card about the size of a standard credit card. The first step in producing the card is to produce a master plate from which the card is embossed to form tracks. The card is formed as a metallised Mylar substrate on which the erasable storage medium is deposited. The master plate may be formed using an electronic or laser scribing process. The data density can be as great as 50000 lines/cm compared with 5000 lines/cm in current dot printed CD technology.

Figure 8:
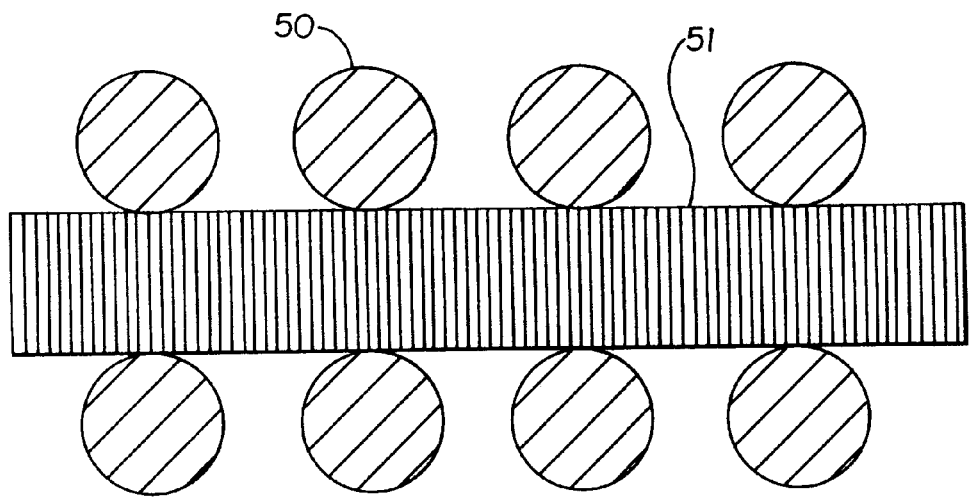
FIG. 8 depicts the track structure of the optical storage means of FIG. 7.

The structure of the data dots 50 and tracking lines 51 is shown in FIG. 8. As discussed above, the data dots are 0.5 $\mu$m diameter on 1.0 $\mu$m centres with a 0.75 $\mu$m pitch. The tracking line has a width of 0.5 $\mu$m.

At this stage each card only holds the raw tracks. The encoding occurs during the write process. The data capacity of the card is more than 250 MB in a single layer without enhanced storage techniques.

The data storage capacity of the optical storage card can be increased by recording data in multiple layers. Since a holographic recording is only reconstructed by illuminating at the original recording angle it is possible to make multiple recordings in the same spot by recording at different angles. The process is essentially the recording of multiple stack of thin film holograms. It is possible to record ten or more thin film holograms in the same diffraction spot.

The inventor envisages a card format as being the most beneficial application of the invention described herein although it will be appreciated that the invention is not limited to cards. An optical data storage card can be used for storing digital information such as digitised photographs, pictures, information and digitised sound recordings. Uses will range from storing of digitised photographs, and related information for drivers licences as a fast and foolproof verification security device and associated hand held peripherals for police and nominated department of transport officials, to credit card and bank card security and verification applications, to a read/write card which can be inserted in place of a magnetic disk for storage purposes, to video card in place of existing video tapes.

Figure 9:
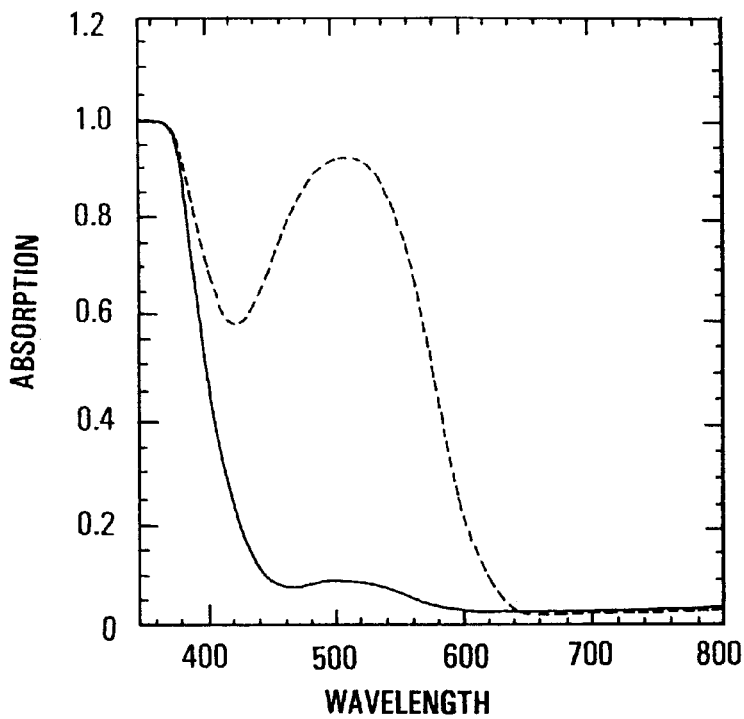
FIG. 9 shows an absorption profile for fulgide in PVCz.

One suitable optical storage medium is a poly(methyl methacrylate) or poly(vinyl carbazole) polymer doped with fulgide E-α(2,5-dimethyl 3-furyl) ethylidene (adamantylidene)-succinic anhydride (an organic dye sold as Aberchrome 670). Fulgides are typically yellow or orange crystalline compounds. The colour in the polymer matrix can be changed to blue by irradiation with ultraviolet light so that the maximum absorption band is in the visible around 525 nm. Data is stored in the medium holographically with a writing wavelength of 355 nm which can be supplied by a frequency tripled diode-pumped Nd:YAG laser. The reading wavelength is outside the absorption band at 670 nm, which can be provided by a diode laser. The recorded data is erased by absorption in the 525 nm band of an erasing wavelength such as 532 nm provided by a frequency doubled Nd:YAG laser or 633 nm provided by a HeNe laser. The absorption profile of the fulgide in PVCz is shown in FIG. 9. The full line shows the absorption spectrum after writing with irradiation near 355 nm and the dashed line shows the absorption spectrum after erasing with irradiation near 532 nm.

Figure 10:
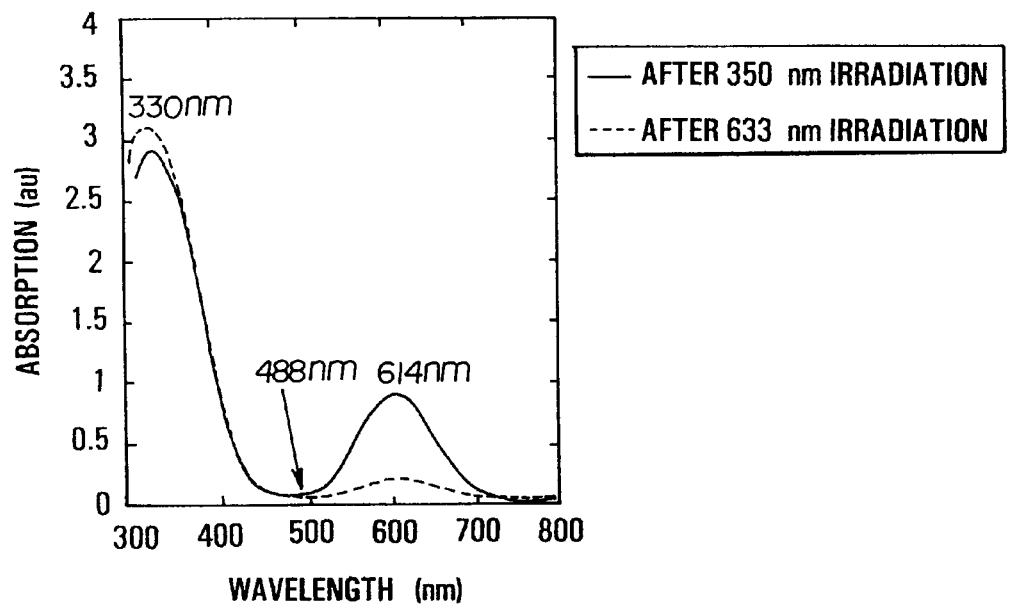
FIG. 10 shows an absorption profile for spiropyran in PVCz.

Other organic-doped polymer systems will also be suitable as the optical storage medium. One such example is spiropyran-doped poly(vinyl carbazole). An optical storage medium of this material can be written at 355 nm (frequency tripled diode-pumped Nd:YAG laser or frequency doubled diode laser), read at 488 nm (frequency doubled diode) and erased at 633 nm (He—Ne laser). The absorption profile of the material is shown in FIG. 10. The full line shows the absorption spectrum after writing with irradiation near 355 nm and the dashed line shows the absorption spectrum after erasing with irradiation near 633 nm.

A further choice for optical storage medium is a photochromic dye dispersed in fulgide doped Polymethyl methacrylate, similar to the first example described above. The material, when exposed to certain wavelengths, creates colour centres in the material. These colour centres have the ability to undergo many reversible transitions. These reversible transitions allow the material to be written to and erased with multiple exposures (up to 100,000 reversible cycles and more). The material is very stable and has no environmental constraints. The shelf life of the material is expected to be in excess of 20 years.

The data is completely non recoverable after erasure, and the absorption band is completely broken down. There is also no possibility of bit migration due to the nature of the material.

The percentage of dye dispersed in the PMMA can be varied to allow wavelength shifting to occur in order to selectively design the material to suit the wavelength characteristics of the laser.

It has been demonstrated that the material has a threshold energy level before erasure takes place and the data is affected. Thus, being wavelength selective, the erasing beam will not affect the prerecorded data when other layers are accessed via Bragg angle selection.

Typically, the material requires a preexposure to a UV lamp/source before the material can be written to in the 490 nm region. Theoretically, a fixed preexposure of the material to UV for a longer period may fix the material permanently and allow the material to be wavelength selective at all times. A typical angle separation between the reference and writing beams for this material is 20°.

In one preferred form the optical head consists of an integrated optical element comprising a fibre-optic bundle that accesses multiple addressable spots on the storage means at any one time. The fibre-optic array is modulated and beam steered using electrooptic and acoustooptic modulators.

Figure 11:
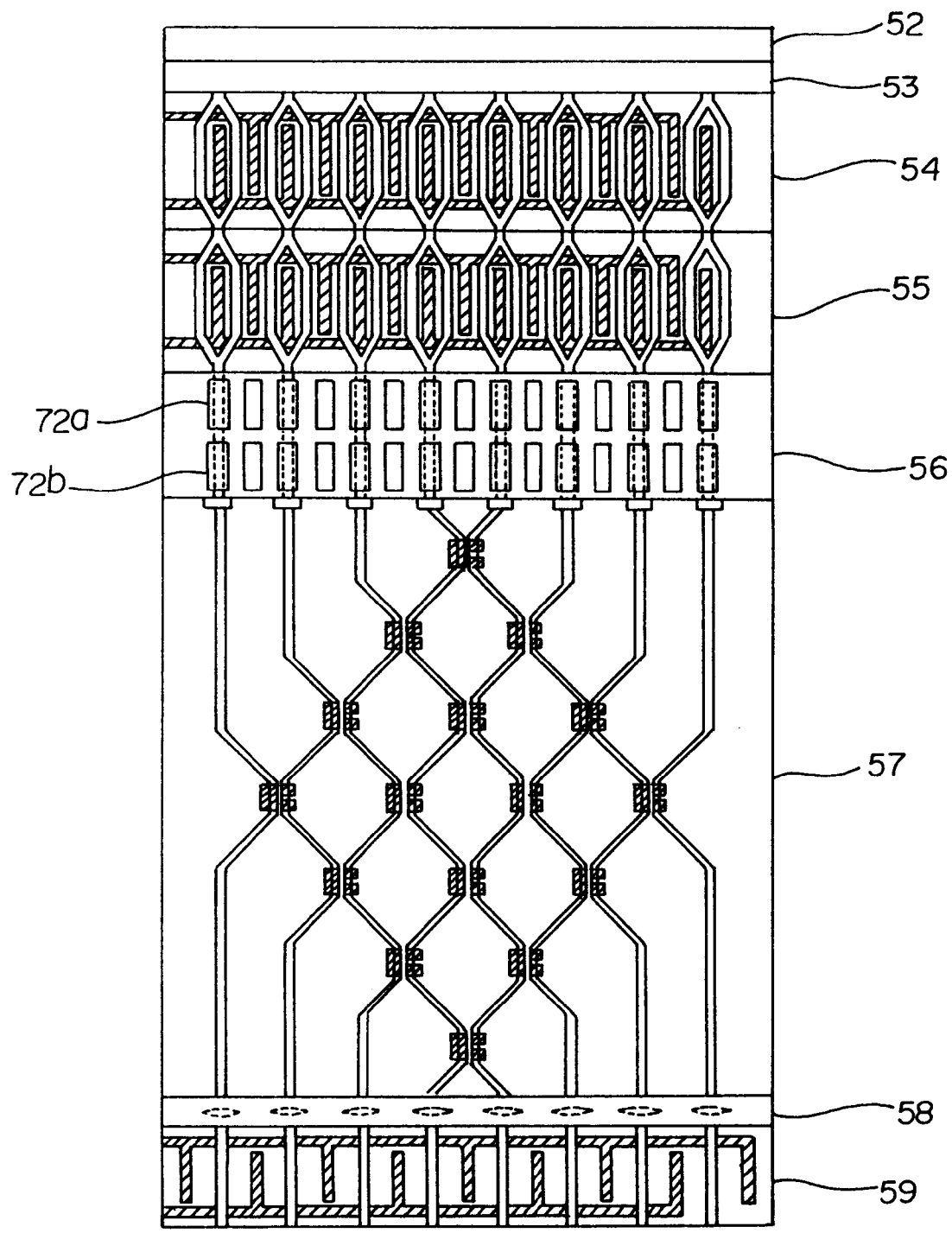
FIG. 11 is a detailed schematic of the optical head of FIG. 5.

The structural components of an optical head 24 for directing coherent radiation for writing, reading and erasing are shown schematically in FIG. 11. A multiplexing array 52 converts the three input beams to one output beam that is wavelength switched in accordance with the write/read/erase cycle. A demultiplexer array 53 splits the output beam into a plurality of beams for launching into an integrated optical waveguide comprising a phase modulator 54, amplitude modulator 55 and polarization modulator 56. From the integrated optical waveguide the beams enter an electrooptic switching array 57 and are then collimated by a holographic optical element 58 and focussed into an electrooptic or acoustooptic beam deflector 59 which directs the beams towards the optical storage means 25 at specific angles.

Figure 12:
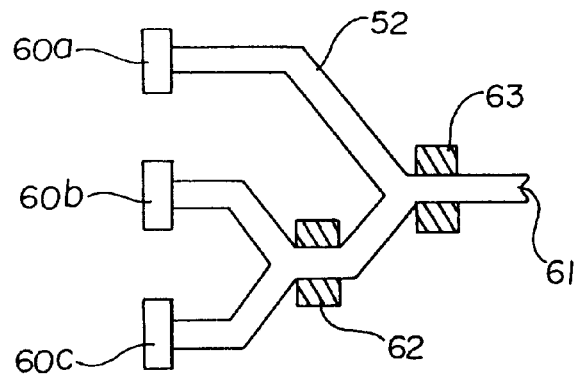
FIG. 12 is a schematic of the multiplexer of FIG. 11.

The multiplexer 52 is shown in more detail in FIG. 12. It comprises one fibre-optic input 60a, 60b and 60c, per laser. The inputs are selectively switched to the output 61 by electrooptic switching elements 62 and 63.

Figure 13:
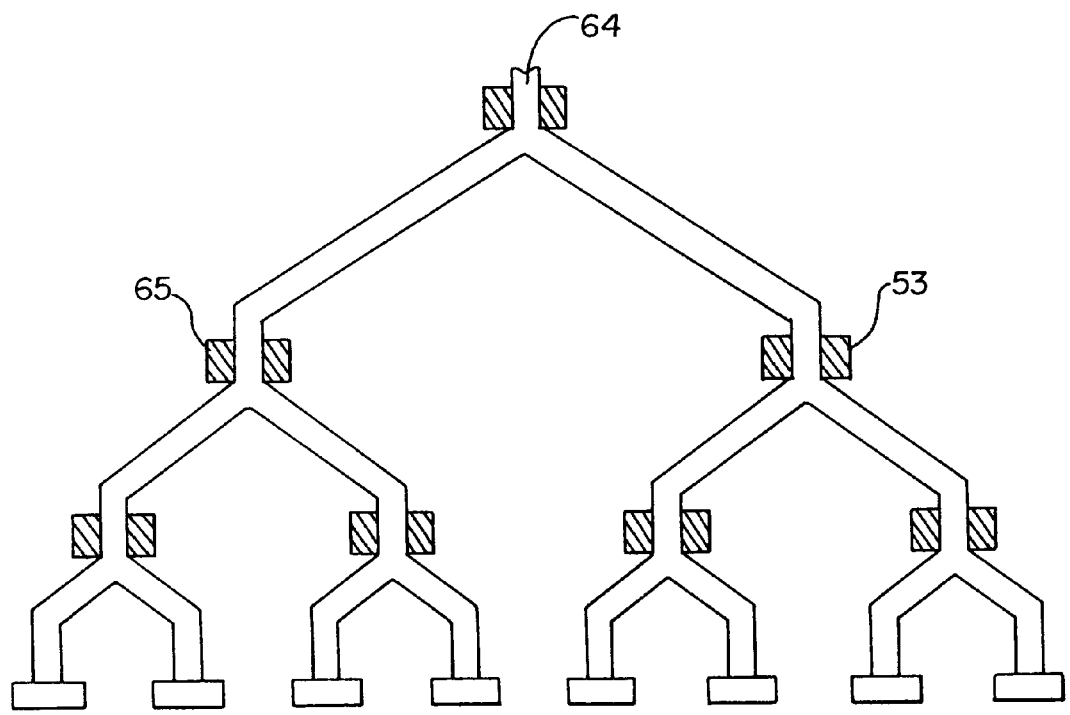
FIG. 13 is a schematic of the demultiplexer of FIG. 11.
Figure 14:
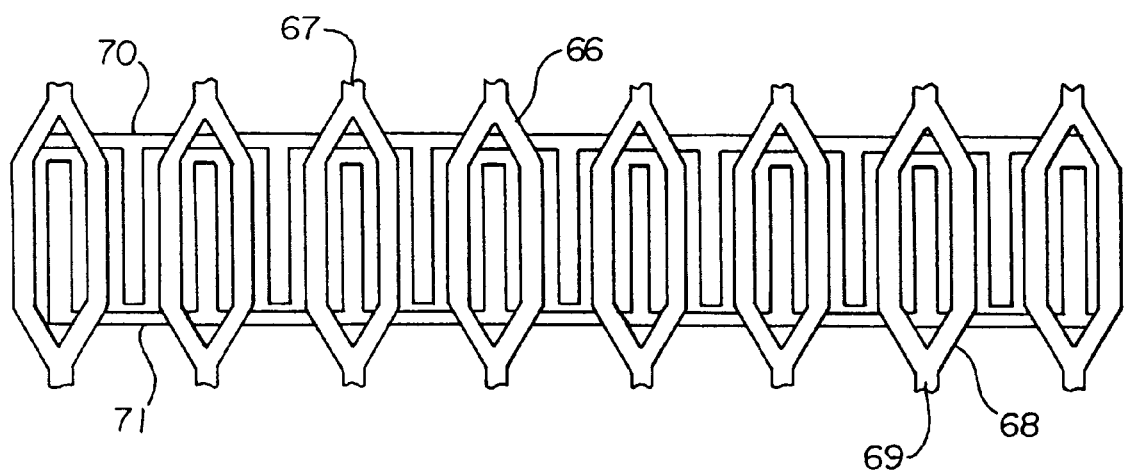
FIG. 14 shows details of the phase or amplitude modulator of FIG. 11.

The output 61 becomes the input 64 to the demultiplexer 53 as shown in FIG. 13. The beam is demultiplexed into a number of beams for launching into phase modulator 54. The demultiplexer 53 has a similar structure to the multiplexer 52 with switching provided by electrooptic switching elements, such as 65.

Amplitude, phase and polarization modulation is achieved through use of optical modulators. The optical modulators are optical waveguide devices fabricated from silica glass or lithium niobate.

The optical waveguide device that controls the amplitude and phase modulation is an interferometric intensity modulator, such as Mach-Zehnder type interferometer shown in detail in FIG. 13. The device comprises multiple modulator elements such as 66. Each element 66 comprises two Y-junctions, such as 67 and 68, that give an equal division of the input optical power. With no potential applied to the electrodes, the input optical power is split into the two arms at the Y-junction 67 and arrives at the second Y-junction 68 in phase giving an intensity maximum at the waveguide output 69. When a potential difference is applied between the electrodes 70 and 71, which operate in a push-pull mode on the two arms of the interferometer, a differential phase change is created between the signals in the two arms. The subsequent recombination gives rise to a variation in the intensity of the output beam which is converted to amplitude modulation in the first device 54 and phase modulation in the second device 55.

Such interferometric modulators have been demonstrated to operate at high speeds. A 1.1 GHz modulation bandwidth has been reported for a 6 mm interferometer employing a 3.8 volt modulation depth across a 0.9 micrometer modulation gap.

Figure 15:
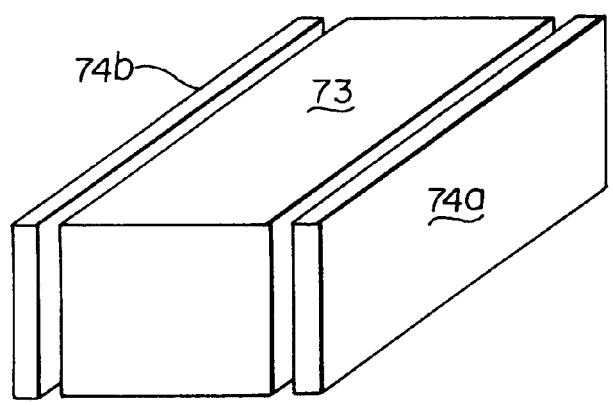
FIG. 15 shows details of the polarization modulator of FIG. 11.

The polarization modulator 56 is shown in more detail in FIG. 15. The device comprises two elements 72a and 72b. Each element comprises a non-linear device 73, such as silica glass or X-cut lithium niobate. The longitudinal electrodes 74a and 74b are placed symmetrically over a Z-propagating waveguide diffused into the nonlinear substrate. Voltages applied to the electrodes produce an electric field that can orientate the polarization of a propagating wave in any direction. This technique offers a robust, mechanically stable method of polarization control which has been demonstrated in both laboratory and field installed optical fibre systems, with no measurable sensitivity penalties. The polarization modulator 56 produces multi-level phase shift keying between TE and TM modes. These polarization states are then maintained during transmission within a single mode fibre. The modulator 56 has a transmission rate of 560 Mbits/sec.

Figure 16:
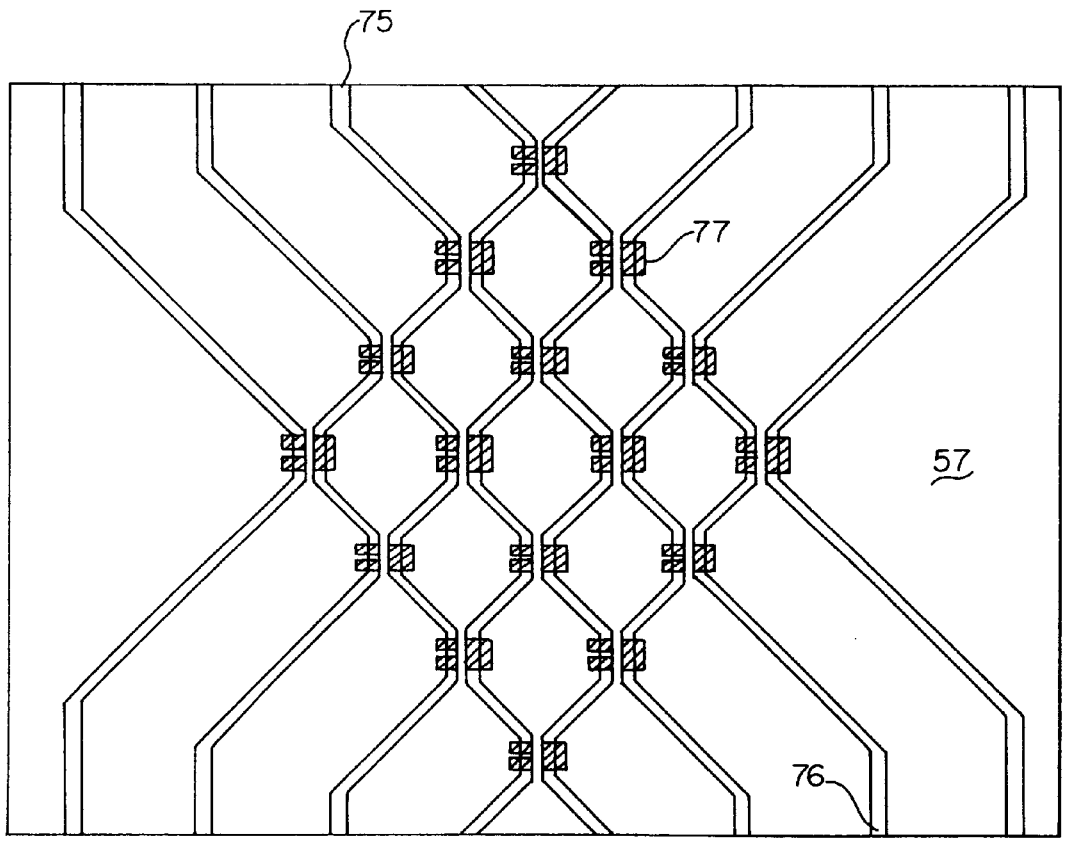
FIG. 16 shows details of the electro-optic switching array of FIG. 11.

The electro-optic switching array 57 is shown in more detail in FIG. 16. The array 57 comprises a plurality of input fibres, such as 75, and a plurality of output fibres, such as 76. A matrix of electrooptic switching elements, such as 77, are arranged such that any input, or combination of inputs can be switched to any one or more outputs.

The holographic optical element 58 is a combined collimator and focussing element that collects the output from the electrooptic switching array 57 and focuses into the beam deflector 59.

Figure 17:
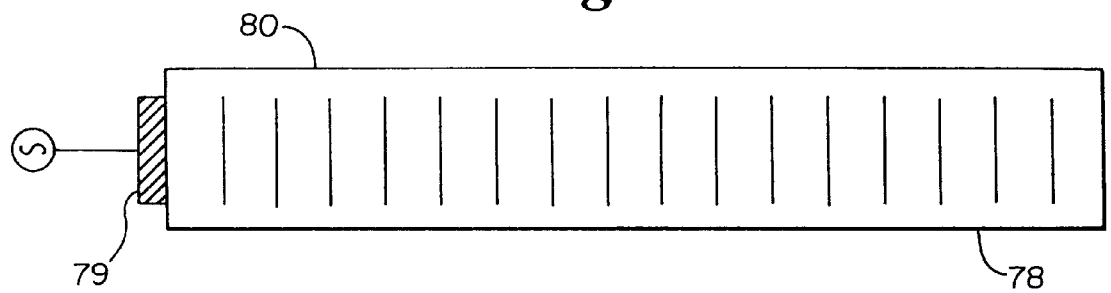
FIG. 17 shows details of the beam deflector of FIG. 11.

The beam deflector 59 comprises an array of acoustooptic or electrooptic modulator elements. An example of one embodiment of an acoustooptic modulator 78, is shown in FIG. 17. Each element comprises an acoustic transducer 79 in close contact with a transparent medium 80. The transducer 79 produces a travelling acoustic wave in the medium 80.

The acoustic wave produces a periodic variation in density (ie mechanical strain) along its path which gives rise to a corresponding change in the refractive index within the medium due to the photoelastic effect. Thus, a moving optical phase diffraction grating is produced in the medium 80. A light beam passing through the medium 80 and crossing the path of the acoustic wave is Bragg diffracted by the phase grating from zero order into higher order modes.

The deflected beams interfere in the optical storage means 25 to form individual diffraction patterns. The location of the diffraction patterns in the XY plane is determined by addressing different cells in the optical head 24. The Z axis is written to by writing at varying Bragg angles to the optical storage means 25, thus creating a series of 2D Fraunhoffer diffraction patterns stacked one on top of the other in the material. The data contained in each diffraction pattern is determined by the phase, amplitude and polarization settings in the optical head 24 as determined by the signal processor means 27.

The diffraction patterns are read by addressing the recorded diffraction patterns across the XY plane and then in the Z plane and reconstructing the holograms. The encoded reading beam will be returned by the hologram and passes back through the optical head, to a detector which records the signal. The signal is analysed in the signal processor means 27 to obtain the phase, amplitude and polarization codes.

As previously mentioned, the beam deflector 59 can be replaced by a servo device to form an optomechanical head. The optomechanical head is physically moved to access different regions of the optical storage means.

The optomechanical head will operate in the same manner as the optical head except that it will physically move in the XY plane through a motor control system and a transducer coil mechanism which allows for high precision alignment during the tracking process.

Figure 18:
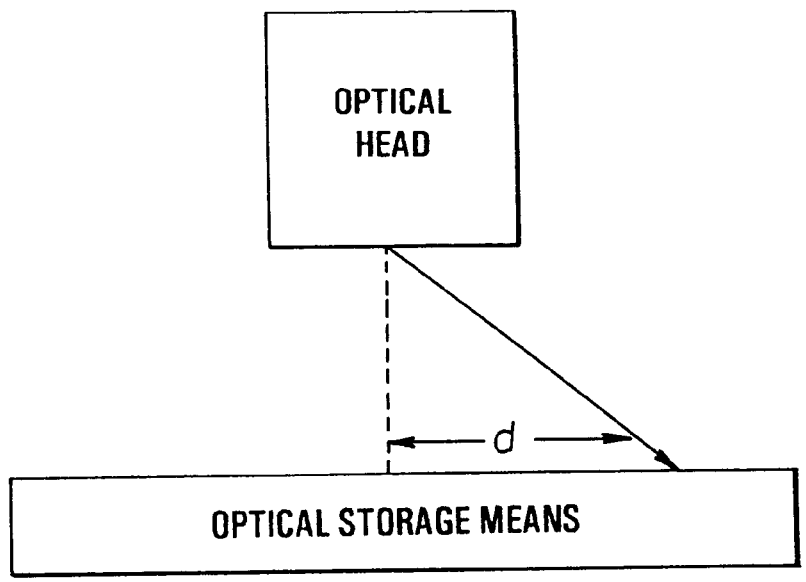
FIG. 18 shows the tracking of an optomechanical head.

To assist in accurate tracking the control means 26 addresses a tracking beam 81 that leads the optomechanical head 82 by an optimum coupling angle, as depicted in FIG. 18. The tracking layer 47 reflects the tracking beam 81 prior to the optomechanical head 82 actually reaching the sector headers. The reflected tracking beam is detected and allows a distance 'd' for the drive to prepare for a write, read or erase operation.

The mechanical portion of the optomechanical head is a two stage servo device capable of achieving linear motions in 3 axis (x, y, and z) with a resolution of +100 nanometers and velocity of 2 m/s or greater.

A high precision zero backlash lead screw driven by a DC servomotor with high count rotary encoder is used for the first stage to position the optical head to within the span of the non-erasable guidance tracks mentioned above. The second stage is a micro positioner such as a peizo-electric (or voice coil) element or, alternatively, a high resolution lead screw drive, similar to the first stage, working in differential mode. The second stage centres the optical head relative to these tracks for accurate writing, reading or erasing. In one form of the second stage PVDF (peizo-electric plastic) is moulded as part of the optical head, thus directly providing micro-motion when energised.

Figure 19:
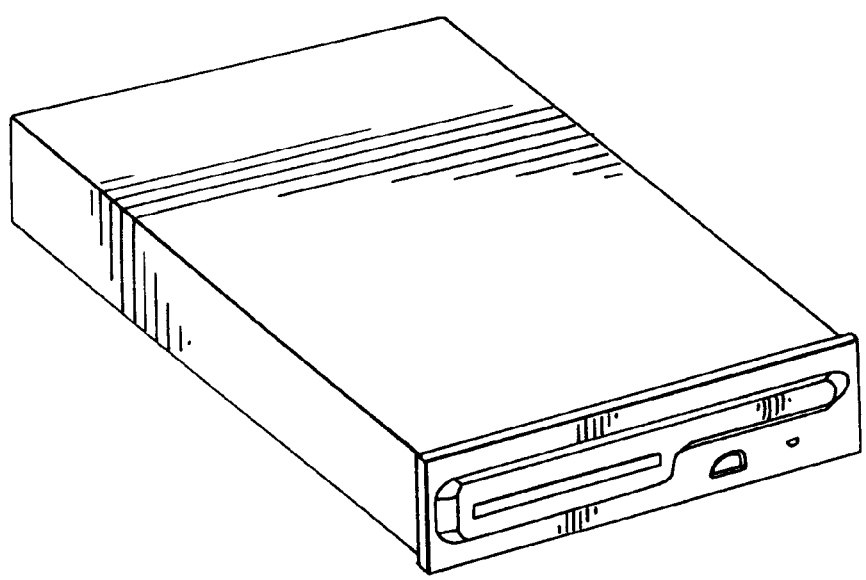
FIG. 19 shows the structure of an optical drive that embodies the optical storage system.

Due to the compactness of the components of the system, the entire system can be contained in a standard size drive that interfaces with a personal computer. A sketch of a suitable drive is shown at FIG. 19. Those skilled in the art will recognise the drive as being similar in size and design to a compact disk drive or floppy disk drive.

The optical storage system described herein is not reliant on complex optical arrangements such as CCD arrays and spatial light modulators to recompose a given data page. Rather, the system provides for simple, low cross-talk, low interference and high signal to noise ratio, as the diffraction patterns require limited image processing, and are easy to distinguish. Thus, the signal processing allows much greater processing speeds due to the simplicity of the conversion algorithms required. Appropriate signal processing algorithms would be well known to persons skilled in the art and determined by the particular encoding scheme employed. The system uses an integrated optical head requiring little or no moving parts. An alternative optomechanical head is also described. The optical head is composed of inexpensive fibres and waveguide structures which are designed for low cost mass production. The optical storage means is preferably the size of a credit card with a durable non-removable outer casing preventing surface degradation from dust, scratching, and general handling. The storage medium of the optical storage means is inexpensive to produce and allows for fast access times. It is capable of reading, writing, and erasing with very low power requirements. The lasers for the optical storage system are inexpensive, compact lasers with low power requirements.

The preferred embodiments described herein are intended to illustrated the principles of the invention, but not to limit its scope. Other embodiments and variations to the preferred embodiments may be evident to those skilled in the art and may be made without departing from the spirit and scope of the invention.

What is claimed is:

1. An optical storage system comprising:
   an optical storage means for holographic storage of data in a plurality of data storage dots, said optical storage means comprising a storage medium being writable, readable and erasable and said data being stored in the form of a diffraction pattern in each said data storage dot;
   a first source of coherent radiation for writing said data in said optical storage means;
   a second source of coherent radiation for reading said data from said optical storage means;
   means for erasing said data from said optical storage means;
   an optical head for directing said coherent radiation for writing, said coherent radiation for reading and said means for erasing to said optical storage means, said optical head including means for modulating said first source of coherent radiation for forming said diffraction pattern; and a control means for controlling the optical head to write, read and erase said data; and signal processing means for encoding the coherent radiation for writing and decoding the coherent radiation for reading.

2. The optical storage system of claim 1 wherein the means for erasing is selected from one of a thermal source, an electric field or a laser operating at a wavelength in an absorption band of the storage medium.

3. The optical storage system of claim 1 wherein the optical head includes detecting means in signal connection with said signal processing means such that the means for modulating said source of coherent radiation encodes the coherent radiation for writing with modulations generated by the signal processing means and the signal processing means decodes modulations detected by the detecting means.

4. The optical storage system of claim 1 further comprising a servo-mechanical means for performing relative positioning of the optical head with respect to the optical storage means.

5. An optical storage means for the optical storage system of claim 1 comprising:
a substrate coated with a reflective material;
a tracking layer deposited on the substrate, said tracking layer including a plurality of tracks, each track having a tracking portion and a data writing portion; and
an erasable storage medium deposited on the tracking layer.

6. The optical storage means of claim 5 wherein the substrate is selected from glass or Mylar.

7. The optical storage means of claim 5 wherein the substrate is coated with a reflective material.

8. The optical storage means of claim 5 wherein the tracking layer is an embossed surface relief layer.

9. The optical storage means of claim 5 wherein the tracking portion of each track is a linear strip and the data writing portion includes said plurality of said data storage dots.

10. The optical storage means of claim 5 wherein the tracking portion and the data writing portion of the tracks are arranged to be closely adjacent so as to provide maximum storage density.

11. The optical storage means of claim 5 wherein tracks are divided into a plurality of sectors and sectors are divided into a number of fields.

12. The optical storage means of claim 5 wherein tracks are divided into a plurality of sectors and sectors are divided into a number of fields and wherein the fields include one or more fields selected from a sector identification field, data identification field, error check and correction field, and data storage field.

13. The optical storage means of claim 5 wherein the erasable storage medium is a thin medium allowing recording of holograms onto a surface.

14. The optical storage means of claim 5 wherein the erasable storage medium is a thick medium allowing recording of multiple holograms at multiple angles and depths in the medium.

15. The optical storage means of claim 5 wherein the erasable storage medium is selected from one of an inorganic photochromic crystal, a photorefractive material, a polymer material, or a thermoplastic material.

16. The optical storage means of claim 5 wherein the erasable storage medium is a thermoplastic material erasable by applying a thermal field.

17. The optical storage means of claim 5 wherein the erasable storage medium is a field-erasable photorefractive polymer material that is erasable by applying a strong electric field adapted to realign the chains of the polymer of the storage medium.

18. The optical storage means of claim 1 wherein each dot has a diameter in the vicinity of 0.5 $\mu$m.

19. An optical head for the optical storage system of claim 1 comprising:
multiplexer means for selecting one or more of said sources of coherent radiation;
demultiplexer means for dividing the selected radiation into multiple beams;
means for coding a modulation to one or more of the multiple beams; and
means for deflecting the modulated multiple beams to a desired location in an optical storage means.

20. The optical head of claim 19 wherein the means for coding a modulation comprises means for coding an amplitude modulation and/or means for coding a phase modulation and/or means for coding a polarization modulation to one or more of the multiple beams.

21. The optical head of claim 19 wherein the means for deflecting the modulated multiple beams comprises a plurality of deflector cells and means for switching one or more of the modulated multiple beams to a desired deflection cell.

22. The optical head of claim 19 further comprising means for receiving reflected radiation and directing the reflected radiation to a detector means.

23. The optical head of claim 19 further comprising means for receiving reflected radiation and directing the reflected radiation to a detector means wherein the detector means detects the phase, amplitude and polarization coding.

24. The optical head of claim 19 wherein the means for coding amplitude modulation and the means for coding phase modulation are one or more Mach-Zehnder type interferometers.

25. The optical head of claim 19 wherein the means for coding a polarization modulation is an electrooptic or acoustooptic polarization control device.

* * * * *